United States Patent Office 2,836,532
Patented May 27, 1958

2,836,532

NEMATODE CONTROL

Eli Seifter, Dayton, Ohio, assignor to Monsanto Chemical Company, St. Louis, Mo., a corporation of Delaware No Drawing. Application December 28, 1955
Serial No. 555,747

2 Claims. (Cl. 167—14)

This invention relates to the control of soil-inhabiting worms and more particularly to the inhibition and eradication of nematodes.

The nematode is an important economic pest, considered to be responsible for annual field crop losses of several hundred million dollars value in the United States alone. Practically all known species of crop and ornamental plants are subject to nematode attack. The root-knot nematode, for example, is responsible for crop reduction, extending up to total loss, of such important economic species as sugar beets, potatoes, citrus crops, etc. Nematode attack may also weaken crops so as to produce accentuated susceptibility to other agricultural hazards such as fungal diseases.

Among presently known agents effective for the control of nematodes, certain volatile fumigants are recognized as effective treatments, but present difficulties in application, in that they are gaseous compounds requiring pressured containers for storage, etc. Attempts have, therefore, been made to provide solid compounds which are nematocidal, by the synthesis of compounds related to these gaseous fumigants which would have the same effectiveness and yet be more readily useful. Thus, for example, since carbon disulfide is known to be a nematocidal fumigant, solid compounds containing a carbon disulfide grouping have been synthesized and tested as nematocides. However, it has been found that not all carbon disulfide derivatives are effective nematode toxicants, whether because they are ineffective in penetrating the difficultly permeable membrane surrounding the various stages in the nematode's existence, e. g., the egg, larvae, and adult stages, or for other reasons, is not known. Difficulties are also encountered with the phytotoxicity of such compounds as are found to be nematocidal, and since the object of nematode-eradicating treatments is to minimize crop damage by these parasites, a necessary attribute of an economically useful nematodical treatment is that the residues remaining from such treatments should be non-phytotoxic.

Accordingly, it is an object of the present invention to provide a method for the control of nematodes. A further object is to provide solid nematocidal compositions. Another object of this invention is to provide a method of treating soil so as to produce a non-phytotoxic environment free of nematode inhabitants. These and other objects of the present invention are attained as described hereinbelow.

In accordance with the present invention, nematode infestations in soil are controlled by applying sodium trithiocarbonate to the soil. Sodium trithiocarbonate is a solid, stable salt, which may be readily prepared as described in copending application, Serial No. 495,064, filed March 17, 1955, by M. L. Nielsen and B. D. Stone, assigned to the same assignee as the present invention.

It has surprisingly been found that the sodium trithiocarbonate salt is unexpectedly superior to the corresponding potassium salt as a nematocide, as shown by the following example:

*Example 1*

In this test the effect of a nematocide is estimated by counting the rate of flexing of nematodes in water, the effect of the nematocide being expressed as a percentage of the normal flexing rate of a control dispersion of nematodes not containing a nematocidal agent. Aqueous suspensions of the nematode *Penagrellus redivivus* containing, respectively, 0.1% sodium trithiocarbonate, 0.1% potassium trithiocarbonate, and no nematode control agent, were observed at regular intervals through a microscope. The results of this test are shown in the following tables:

| Motility After— | Sodium Trithio-carbonate | Potassium Trithio-carbonate | Control |
|---|---|---|---|
| | Percent | Percent | Percent |
| 10 min | 50 | 100 | 100 |
| 1 hr | 5 | 75 | 100 |

In twenty-four hours, the motility of the nematodes in the suspension containing 0.1% sodium trithiocarbonate was zero, while the nematodes exposed to the same concentration of the potassium trithiocarbonate salt were still active.

The present sodium salt has also been found unexpectedly superior to potassium trithiocarbonate as a nematocide, in that the phytotoxicity of the sodium salt, surprisingly, is less than that of the potassium salt. This is illustrated in the following example wherein the effectiveness of the present compound as a soil treatment is illustrated:

*Example 2*

Containers holding 500 grams each of uninfected soil are inoculated with the root-knot nematode Meloidogyne spp., by addition to each container of 25 ml. of an aqueous suspension containing ground roots of plants infected by this nematode. After the soil has been inoculated, sufficient water is added to bring the potting soil to about ½ field capacity. The soils are then treated with the test chemical to produce predetermined concentrations thereof, after which the treated soil and containers of untreated control soil batches, infected similarly, are drenched with water, capped, and allowed to stand one week. A two-week old Marglobe tomato seedling is then transferred to each container. After a growing period of two months, the tomato plants are harvested and the roots washed and examined for evidence of infection.

In this test, it was found that at a rate, e. g., of 400 lbs. per acre, all tomato seedlings planted in the sodium trithiocarbonate-treated soil survived, and there was obtained 100% control of the nematode infection as compared to the similarly infected plants not receiving the trithiocarbonate treatment. With potassium trithiocarbonate, on the other hand, the tomato seedlings died when exposed to this concentration. Similarly, at lower rates, while the sodium trithiocarbonate completely suppressed the Meloidogyne spp. infestation of the tomato plants at, e. g., 200 lbs. per acre, the rates of the potassium trithiocarbonate which were sub-phytotoxic were too low to produce entire elimination of the nematode population, and the plants suffered from nematode infestation.

Field tests with sodium trithiocarbonate showed that very substantial suppression of nematode infection, reducing the neamtode population in the soil by about 70 to 75%, could be obtained at rates as low as 100 lbs. per acre.

To attain even distribution of the present nematocidal compound in the soil, it is preferred to incorporate it with an inert carrier, which may be, e. g., a solid or a liquid. If desired, the present compound may be dissolved in irrigation water, for example. Particularly preferred, however, is application as a dust, e. g., in admixture with a solid carrier. Examples of solid inert carriers useful in the present application are, e. g., talc, fuller's earth, bentonite, diatomaceous earth, etc. Alternatively, or in addition, the nematocidal dust containing sodium trithiocarbonate as an active ingredient may also be admixed with soil-conditioning agents, fertilizers, or other agricultural agents.

The present thiocarbonate is effective in eliminating or suppressing nematode activity when applied to the soil at the rate of 50 to 500 lbs. per acre. Usually, concentrations of 150 to 250 lbs. per acre will produce effective nematode control in soils of average infestation level. Lightly-infected areas may be treated effectively with smaller concentrations. In addition to use in soils, the compositions of the invention may also be applied to other nematode environments, such as greenhouse potting mixtures and other soil substitutes. The present compositions are also useful in destroying animal and/or parasitic worms such as flukes and tapeworms during the soil phase of their life cycle and may usefully be applied, e. g., to barnyards and other soils which it is desired to sterilize.

What is claimed is:

1. The method of controlling nematodes which comprises subjecting said nematodes to a toxic quantity of a nematocidal composition comprising as the essential active ingredient sodium trithiocarbonate.

2. A nematocidal composition comprising an inert carrier and, as the essential effective ingredient, sodium trithiocarbonate.

References Cited in the file of this patent

UNITED STATES PATENTS

| | | |
|---|---|---|
| 2,676,129 | Bashour | Apr. 20, 1954 |
| 2,731,487 | Bashour | Jan. 17, 1956 |